United States Patent [19]
Avis

[11] 3,712,039
[45] Jan. 23, 1973

[54] CROP PICK-UP HARVESTER
[75] Inventor: John M. Avis, Nunice, Mich.
[73] Assignee: Harvey Harvester, Inc., Spring Lake, Mich.
[22] Filed: Aug. 18, 1971
[21] Appl. No.: 172,623

[52] U.S. Cl............56/328 R, 15/84, 56/11.9, 56/15.8, 56/16.2, 56/16.5, 209/107
[51] Int. Cl...........................A01g 19/00
[58] Field of Search..........56/328 R, 330, 11.9, 15.8, 56/15.9, 16.2, 16.3, 16.5, 16.6, 364; 15/82–86; 209/107, 106; 193/7

[56] References Cited

UNITED STATES PATENTS

| 366,721 | 7/1887 | Graves | 193/7 |
|---|---|---|---|
| 1,317,342 | 9/1919 | Williams | 209/107 |
| 1,621,695 | 3/1927 | Tuite et al. | 209/107 |
| 2,099,222 | 11/1937 | Paxton | 209/106 |
| 2,624,458 | 1/1953 | Molnau | 209/107 |
| 2,854,808 | 10/1958 | Ramacher et al. | 56/328 R |
| 2,971,314 | 2/1961 | Lewis | 56/15.8 |
| 3,055,162 | 9/1962 | Phillips | 56/328 R |
| 3,475,889 | 11/1969 | Overstreet et al. | 56/328 R |

FOREIGN PATENTS OR APPLICATIONS

| 1,430,313 | 1/1966 | France | 56/328 R |
|---|---|---|---|
| 1,065,048 | 4/1967 | Great Britain | 56/328 R |

Primary Examiner—Louis G. Mancene
Assistant Examiner—J. A. Oliff
Attorney—Andrew J. Beck et al.

[57] ABSTRACT

A mobile harvester for picking up fruit such as apples, oranges, nuts or vegetables for example, lying on the ground, passing the crop through a trash separator and then discharging the crop from the harvester into a storage box or truck. The harvester includes a covered sweeper or rotary pick-up device having flexible fingers around its periphery and which rotates at its underside in a forward direction in respect to the movement of the vehicle, to thereby convey the crop over the rotary pick-up device and to a transverse conveyor with a minimum of damage to the fruit. The pick-up device of the harvester is mounted for pivoting about a central, longitudinally arranged pivot point, and the pick-up device is furthermore mounted for generally vertical swinging, whereby the pick-up device can closely follow the contour of the ground over which the harvester travels. The harvester also includes a trash separator which separates trash from the crop and which additionally acts to clean the crop before discharging it into the storage bins.

15 Claims, 10 Drawing Figures

INVENTOR.
JOHN M. AVIS

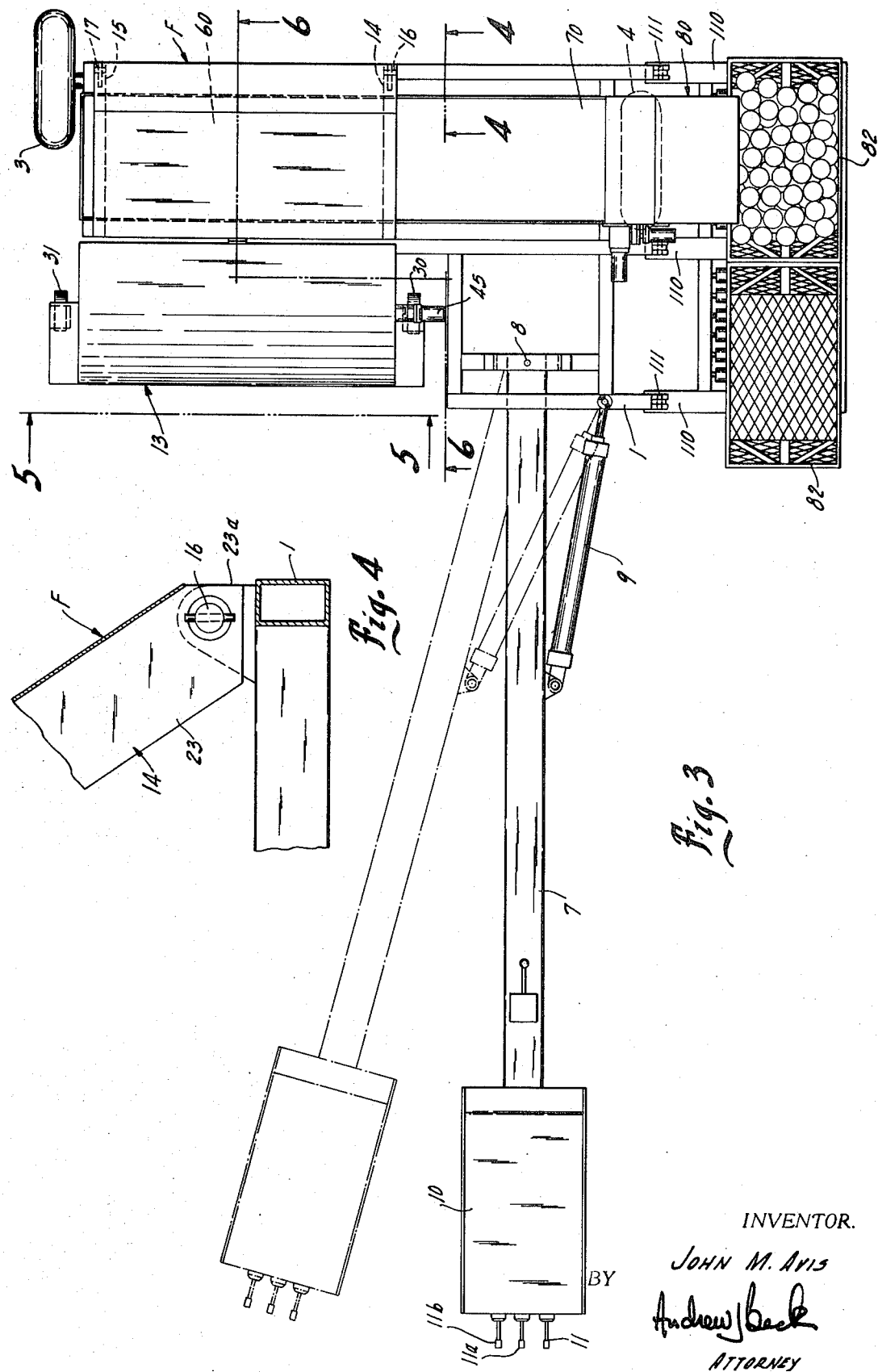

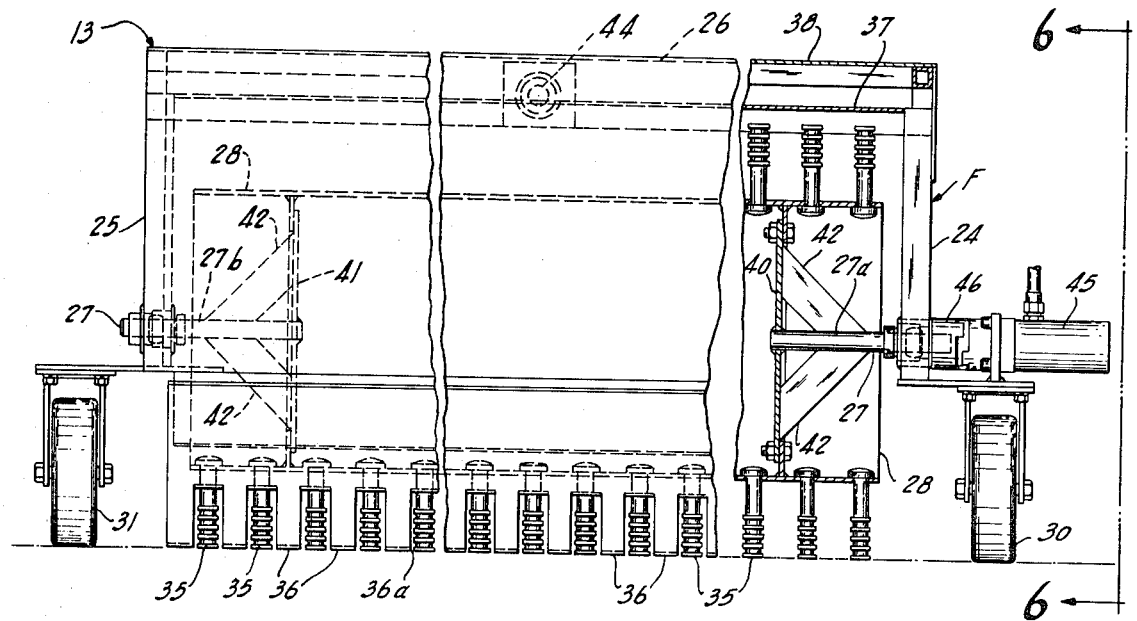
Fig. 5
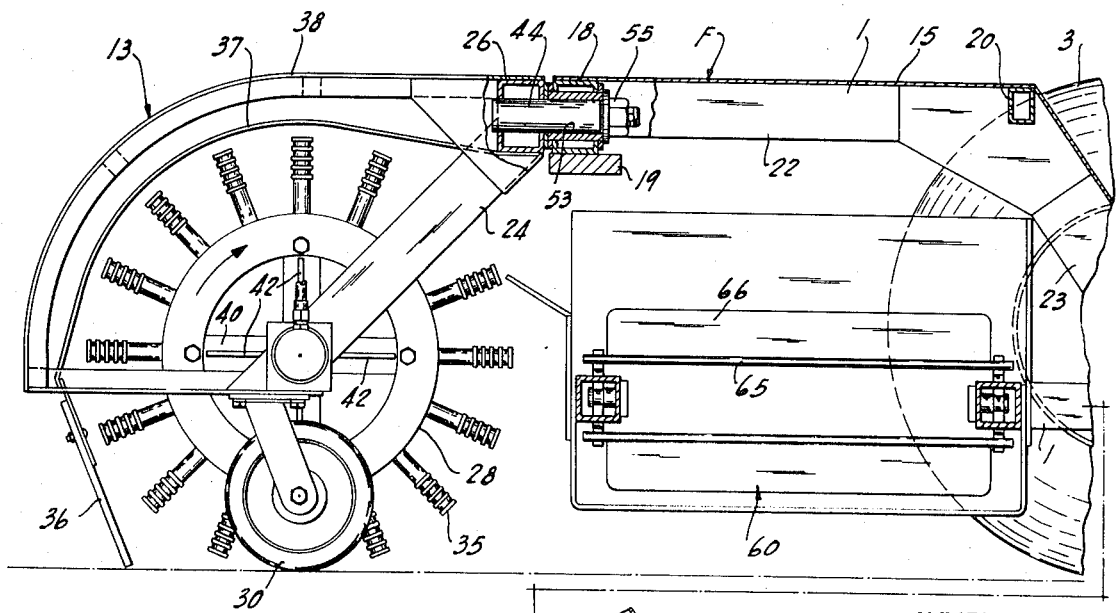
Fig. 6
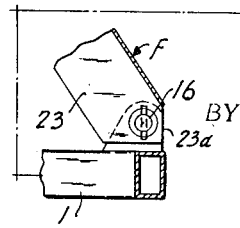
INVENTOR.
JOHN M. AVIS
BY
Andrew J Beck
ATTORNEY

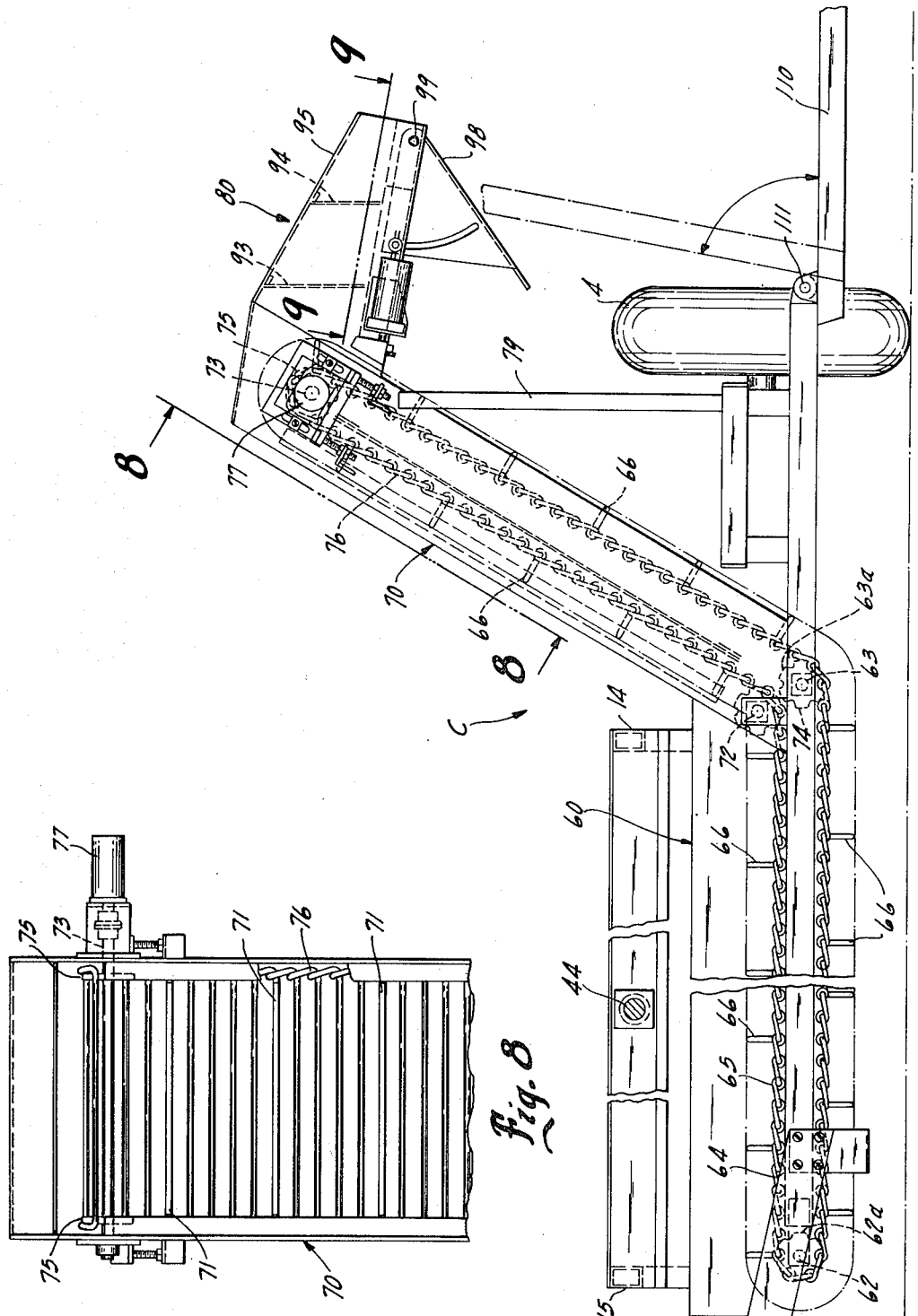

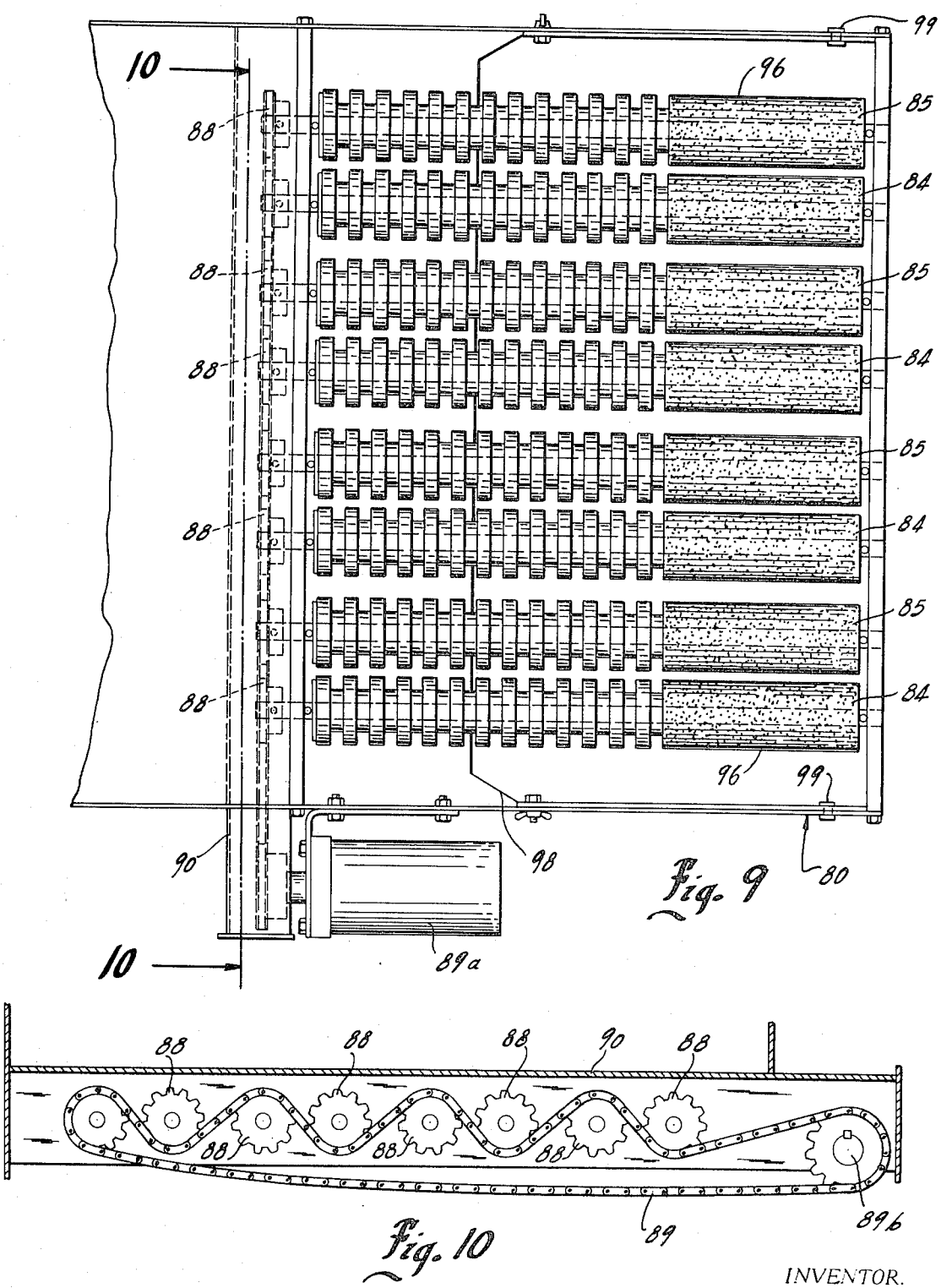

CROP PICK-UP HARVESTER

BACKGROUND OF THE INVENTION

The invention pertains to pick-up fruit harvesters of the type which travel over the ground and pick up fallen fruit lying loosely on the ground. Among these prior art harvesters are those of the type utilizing pick-up blades, plows and rotary devices cooperating therewith for picking up the fruit, but these prior art devices had certain shortcomings. Among the primary objections to these prior harvesters was their tendency to damage or break the skin of the fruit as the rotary device propelled fruit against the pick-up blade.

Such prior art harvesters have also utilized rather complicated and numerous conveyors and other parts in order to convey the crop from the ground to a storage container, trailing wagon or the like. Often orientation of such conveyors was such that fruit damage was induced. Further, these prior harvesters were costly to manufacture, difficult to keep operative, did not efficiently deliver a clean and undamaged crop, and were often too wide to pass freely between the rows of trees or maneuver into the spaces between the individual trees of any row of trees.

SUMMARY OF THE INVENTION

The present invention provides a mobile harvester of the type for picking up a crop lying loosely on the ground, such as nuts, vegetables, apples or oranges for example, and conveying the crop to a side discharge elevator for ultimate deposit in a removable storage container carried on the harvester, or into an adjacent vehicle.

The above harvester is arranged so that the crop passes through a trash separator for removing the twigs, leaves, paper, or other foreign material from the crop before the crop is discharged to the storage container. The separator also acts to clean the crop by a brushing action, all without damage to the crop.

The invention includes an improved rotary pick-up device for gently but positively raising the crop from the ground and depositing it on a rearwardly located conveyor. The rotation of the rotary pick-up unit is such that the lower side of the rotary pick-up drum moves forwardly in respect to the direction of harvester travel and conveys the crop over the drum and then rearwardly to the conveyor. The rotary pick-up drum includes a plurality of flexible fingers around its periphery which positively yet gently lift the crop from the ground and convey it over the rotary device and into the elevator. The rotary pick-up device also includes an improved mounting therefor, whereby the generally cylindrical pick-up drum can pivot about a centrally longitudinally disposed axis, thereby permitting the ends of the drum to rise and fall in opposition to one another. The improved mounting also includes a rearwardly located, transversely arranged pivot point which is so located that the drum can also bodily rise and fall in a generally vertical direction to also accommodate undulating ground. The arrangement and location of this rear pivot are such that, regardless of the vertical position of the rotary crop unit, the pick-up device properly delivers the crop to the rearwardly located conveyor without the loss of any of the crop. The rotary crop pick-up device can also be easily and quickly shifted to an elevated, transport position.

Another aspect of the invention relates to an improved hydraulic drive system for the various component parts of the harvester.

These and other objects and advantages of the present invention will appear hereinafter as this disclosure progresses, reference being had to the accompanying drawings.

BRIEF DESCRIPTION OF THE DRAWINGS

FIG. 3 is a plan view of the harvester shown in FIG. 1;

FIG. 4 is an enlarged, detailed, sectional view taken generally along the line 4—4 in FIG. 3;

FIG. 5 is a front elevational view of the pick-up unit taken generally along the line 5—5 in FIG. 3, but on an enlarged scale and showing certain parts as being broken away, in section, or removed for the sake of clarity in the drawings;

FIG. 6 is a view taken generally along the line 6—6 in FIG. 5, but showing certain parts as being broken away, in section, or removed for the sake of clarity in the drawings;

FIG. 7 is a transverse sectional view through the machine, the view being taken generally along the line 7—7 in FIG. 1, but on an enlarged scale;

FIG. 8 is a view taken along the line 8—8 in FIG. 7;

FIG. 9 is a plan view of the trash separator and taken generally along the line 9—9 in FIG. 7, but on an enlarged scale;

FIG. 10 is a sectional view taken along line 10—10 in FIG. 9.

DESCRIPTION OF A PREFERRED EMBODIMENT

Main Frame

Figures 1, 2:
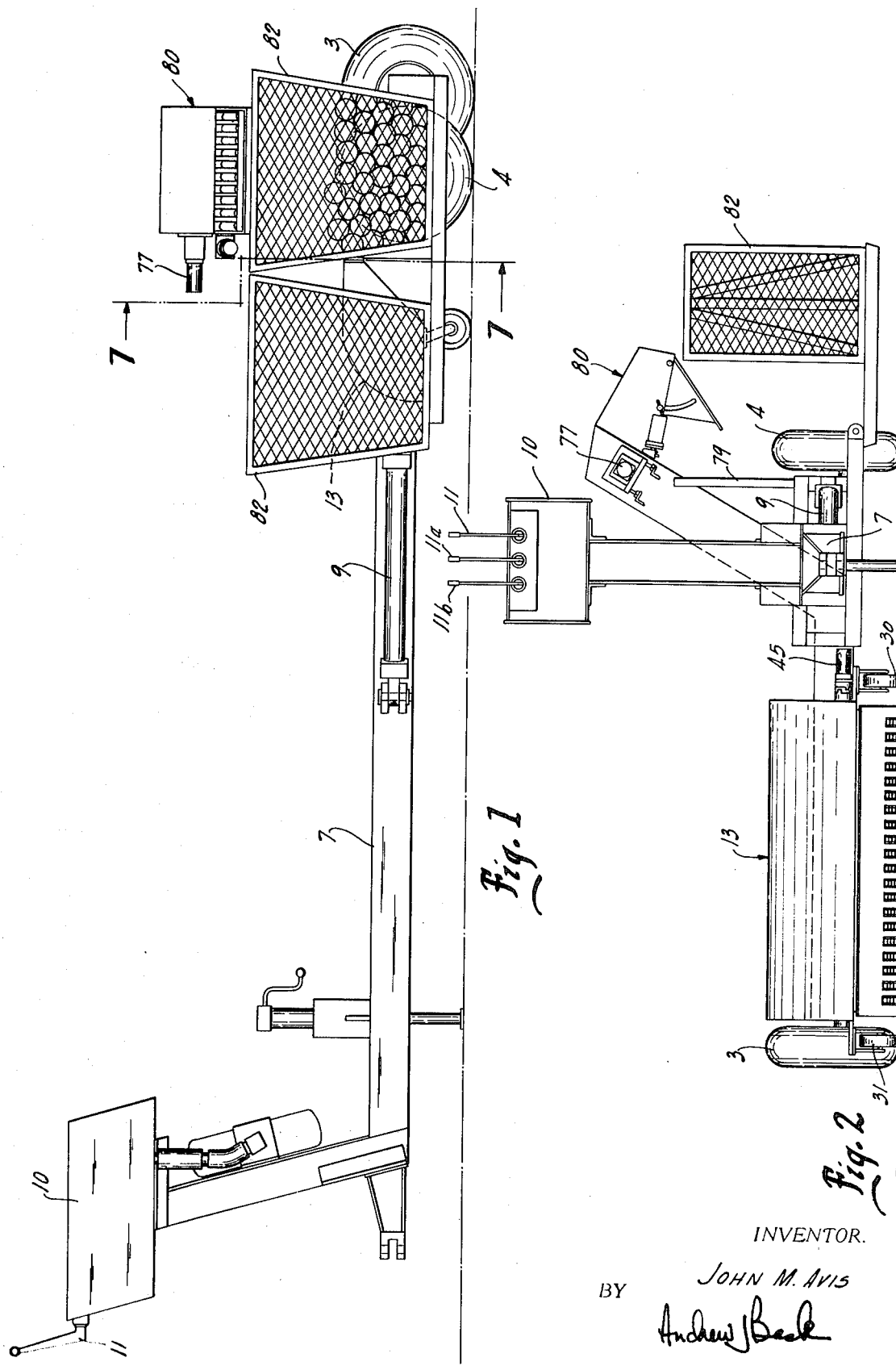
FIG. 1 is a side elevational view of a harvester embodying the present invention.
FIG. 2 is a front elevational view of the harvester shown in FIG. 1.

The harvester provided by the present invention includes a main, generally horizontal frame 1 which is fabricated from a number of steel members welded or otherwise secured together, the main frame being supported for travel over the ground by a pair of laterally disposed ground wheels 3 and 4. A swingable drawbar 7 extends generally forwardly from the main frame and at one side therefrom and is pivoted to the main frame about a generally vertical pin 8 (FIG. 3). A hydraulic, double acting cylinder unit 9 is connected between the main frame and the draw bar so as to laterally adjust the draw bar in respect to the main frame thereby changing the trailing position of the harvester in respect to the pulling vehicle (not shown), such as a tractor or the like. An operator's control box 10 is located on the upwardly extending portion of the draw bar and the operator's levers 11, 11a, and 11b are provided, respectively for causing rotation of the pick-up drum, swinging of the drawbar, and operation of the conveyors, as will appear. The control box is connected by the various conduits to the various fluid motors of the harvester, as will also appear.

Crop Pick-Up Assembly

A crop pick-up assembly is provided for the harvester and includes a rotary pick-up device 13 mounted on a swingable frame F (FIGS. 4, 5 and 6) in such a manner as to be able to follow the contour of the ground, as follows.

The rotary pick-up device 13 is mounted along the forward side of the main frame 1 on the generally vertical swingable frame F. The frame includes a pair of laterally spaced and generally fore and aft positioned arms 14 and 15 which are pivoted about a generally transverse, horizontal axis by means of pins 16 and 17 (FIGS. 3 and 4) to the main frame. More specifically, it will be noted that frame F includes a forward, generally vertically disposed and transverse tube 18 and brace 19 (FIG. 6). Another laterally extending brace 20 is rigidly secured intermediate the length of the arms. The frame also includes an intermediate portion 22 which extends rearwardly from the device 13, and also includes a rear, downwardly extending portion 23 having an end 23a which is pivoted to the main frame.

The rotary pick-up device 13 also includes a pair of laterally spaced, upwardly and rearwardly extending arms 24, 25, rigidly secured together at their rear end by a transversely positioned, tubular member 26. A generally cylindrical, rotatable drum 28 is journalled by shaft means 27 in the lower ends of the arms 24, 25 and a pair of ground engaging, skids or wheels 30 and 31 are rigidly attached to the lower ends of the arms so as to be able to follow the contour of the ground and maintain the drum at a predetermined distance above the ground being traversed. The cylindrical drum has a plurality of rubber sweeping fingers 35 extending radially therefrom, in transversely and circumferentially spaced relationship. These fingers are flexible and are adapted to sweep along the ground to contact the fruit to be picked up. It will be noted from the direction of the curvilinear arrows that the drum rotates in a direction so that its lower surface moves forwardly in respect to the direction of harvester travel. Each of the fingers 35 are serrated along at least a portion of their length to facilitate grasping of the crop but preventing bruising thereof.

A canvas flap 36 extends across the front end of the rotary pick-up unit 13 and has a series of recesses 36a (FIG. 5) cut therein along its length. The flap is adapted to engage the ground as the harvester moves thereover and the crop such as apples or oranges are engaged by the flap to cause the latter to flex rearwardly, thereby permitting passage of the crop into contact with the fingers which are generally moving forwardly and upwardly in that area.

The notches or recesses in the flexible flap permit entry of the crop into engagement with the fingers, but also prevents the entire flap from swinging rearwardly, due to the resistance of a heavy collection of the crop on the ground, which would interfere with the pick-up action of the fingers.

The action of the pick-up device is such that the crop is lifted gently but positively by the fingers and conveyed against the inner, arcuate cover 37 of the pick-up unit, thereby holding the crop captive between the fingers and the cover as the crop is lifted over the rotatable drum. The pick-up unit also includes an outer cover 38 for protecting the pick-up unit from branches of the trees or other obstacles.

The rotatable drum is of light-weight, yet rigid construction and the shaft means 27 comprises two stub shafts 27a and 27b (FIG. 5) which are connected to the cylindrical drum by means of the internal spiders 40 and 41, respectively. Gusset plates 42 act as braces between the spider and the two stub shafts and the rubber fingers are fastened and extend through the cylindrical drum.

The rotary pick-up drum is driven by a conventional fluid motor 45 which has a detachable coupling 46 with the end of one of the stub shafts 27a.

The rotary pick-up device 13 is mounted for swinging about a generally fore and aft, horizontal and centrally disposed pivot shaft 44 which extends through and is fixed to the tubular member 26 of the pick-up device. The shaft is journalled in an aperture 53 located in the central portion of the tube 18 of the frame F. A nut 55 threadably engages the end of the shaft 44 and holds the pick-up device captive on but detachable relative to the frame F.

With the above mounting for the pick-up device, it can closely follow the contour of the ground, that is to say the ends of the drum can rise and fall in opposite directions about the transversely central pivot shaft 44, and the pick-up device can also bodily rise and fall in a generally vertical direction about a rear and relatively low pivot axis formed by pins 16 and 17. In this manner, the rotary pick-up device is flexibly mounted and can maintain a constant attitude to the ground over which it traverses. Because the pivot axis of pins 16 and 17 is relatively low, pivoting of the drum thereabout will be strictly vertical, with practically no horizontal component of movement. In this manner, interference with vertical drum movement, which might otherwise be particularly problemical upon traverse pivoting of the drum about the axis of the pivot shaft 44, is circumvented.

Conveyor

A generally transverse, paddle type endless conveyor C is rotatably mounted on the main frame and has a transverse portion 60 located directly behind the rotary pick-up device 13 for receiving the crop therefrom. More specifically, conveyor portion 60 is located under the frame F of the pick-up assembly and receives the crop as it is discharged rearwardly over the top of the pick-up drum. The conveyor C includes four, fore and aft arranged and transversely spaced shafts 62, 63, and 72, 73, each having a pair of sprockets 62a, 63a, 74 and 75 (FIG. 7), respectively, fixed to their ends. The conveyor also includes a pair of endless, flexible members 64 which are connected by the fore and aft arranged, parallel rods 65. A series of spaced apart paddles 66 are also connected between the pair of endless members so that the crop is conveyed on the rods 65 in a transverse direction with respect to the forward direction of harvester travel. The spaced apart rods 64 permit a certain amount of foreign material to pass therethrough as the conveyor travels in its endless path. The crop is conveyed transversely by the upper flight of the conveyor portion 60 and delivered to the upwardly inclined and transversely extending, elevating conveyor portion 70. Portion 70 serves as an elevating conveyor for delivering the crop upwardly to a trash separator, to be described.

Trash Separator

A trash separator 80 is mounted adjacent the upper end of the conveyor portion 70, receives the crop therefrom and separates the trash, such as branches, leaves, paper or other foreign material from the crop before the crop is discharged from the separator into the storage boxes 82.

More specifically, the separator 80 includes four pairs of oppositely rotating rollers, the individual rollers 84, 85 of each pair rotating in a direction opposite one another to thereby pull the foreign material downwardly through the nip formed between the individual rollers of the pairs of rollers.

The rollers themselves are fabricated from rubber and are corrugated along a portion of their length, as shown in FIG. 9, to provide an aggressive pulling action on the foreign material, without damaging the crop.

It will be noted that the rollers each have a sprocket 88 at the forward end, which sprockets are all connected together by the drive chain 89. A fluid motor 89a is connected by its shaft 89b to the chain 89. A chain guard 90 extends over the sprockets and chain thereby preventing the crop from contact therewith as it falls from the elevator 70 onto the rollers.

The separating unit is inclined downwardly (FIG. 7) so as to cause the crop to move by gravity over the rollers. In order to insure that the crop and trash do not move too rapidly over the rollers, flexible means in the form of a pair of curtains 93 and 94 are attached to an upper housing 95 that extends over the rollers, and these flexible means act to impede the passage of the crop and trash over the rollers, thereby insuring good trash separation from the crop. The separating unit rollers may be horizontally oriented to reduce the speed of crop travel through the separator and also to permit positioning of taller boxes under the outboard end thereof. The angle of inclination of the separator and the length of the rollers may be varied.

The separator also acts to clean the crop as it moves over the discharge end thereof and this is accomplished by having the rearward portion of the rollers formed as brushes 96 which act to rub against the complete surface of the crop as the latter roll and tumble over the rollers, thereby insuring cleanliness of the crop before discharge into the boxes 82.

A trash shield 98 is pivotally mounted at 99 to the lower end of and beneath the separator, and is inclined so as to act to cause the trash to fall by gravity away from the crop discharge end of the separator and more particularly away from boxes 82.

The rollers are sufficiently flexible to permit the passage of branches, etc. downwardly between the rollers, are aggressive to positively separate the trash, and at the same time do not damage the crop passing over them.

Storage Means

The storage boxes 82 are carried by the platform 110 which is pivoted to the main frame at 111. The boxes can be easily placed on or removed from the platform, and when it is desired to transport the vehicle, the platform can be swung to an upper transport position.

SUMMARY

The pick-up harvester provided by the present invention has a crop pick-up device which is capable of maintaining a constant attitude over undulating ground and its ends can rise and fall in opposite or similar vertical directions. The pick-up device can also rise and fall bodily due to its rearmost and relative pivot point which is located behind the transverse conveyor; regardless of the vertical movement of the pick-up device relative to the transverse conveyor, the crop material will not be lost therebetween. The flexible fingers of the pick-up drum rotate in a forwardly direction at the underside of the drum and cooperate with the flexible, notched flap as well as with the arcuate cover surrounding a portion of the drum to thereby gently but positively lift the crop material over the rotary pick-up device without damaging the skin of the crop. Furthermore, the crop pick-up device can be elevated about its said rearmost pivot point to a locked, transport position.

The trash separating mechanism of the present invention insures that trash is removed from the crop as the latter passes thereover and is discharged away from the storage box. On the other hand, the separator rollers are of such a nature that they handle the crop gently and the rollers also include brush portions which clean the crop before it is discharged therefrom.

The harvester in general delivers the crop to a discharge location and is of compact design, primarily being relatively narrow for good maneuverability between the rows of trees and also for in between the tree of any row. The harvester utilizes a minimum number of conveyors for the function obtained, is relatively simple and easy to maintain. The conveyors themselves are of the type which eliminate a considerable amount of trash before the crop and other material reach the trash separator.

I claim:

1. A pick-up harvester for a crop such as apples, oranges, or the like lying on the ground, said harvester comprising: a main frame having ground-engaging means for travel over the ground, a swingable frame having a forward end, a rotary crop pick-up device pivotally mounted on said forward end of said swingable frame and arranged transversely with respect to the normal direction of harvester travel, said crop pick-up device being pivotally mounted solely intermediate its transverse length for swinging about a generally fore and aft axis in respect to normal forward movement of said harvester whereby the transverse ends of said device can rise and fall in opposition to one another, said rotary pick-up device including a drum rotatable about a horizontal, transversly extending axis with its lowermost side rotating forwardly in said direction of harvester travel, a plurality of flexible fingers mounted on and extending outwardly from the drum, a cover extending around and spaced from a portion of the periphery of said drum and cooperating with said fingers to convey the crop engaged by the fingers upwardly and over the drum for discharge rearwardly therefrom, said swingable frame also having an intermediate portion which extends rearwardly from said device, and a rear downwardly extending portion having a rear end, said rear end being pivotally attached to said main frame about a generally transverse and horizontal axis whereby said device can bodily swing in a generally vertical direction, and a transversly moving conveyor mounted on the main frame for receiving the crop discharged by said rotary pick-up device and for delivering the crop transversely on said harvester.

2. The harvester as claimed in claim 1 including ground engaging gauge means mounted on said crop pick up device for maintaining said device at a constant attutude to the ground over which it traverses.

3. The harvester set forth in claim 1 including an elevating conveyor located on the said harvester for receiving the crop from said transversely moving conveyor and elevating said crop, and a trash separator located adjacent the upper end of said elevating conveyor for receiving the crop therefrom, said separator including a plurality of pairs of rollers, said rollers adapted to pull foreign material downwardly therethrough while permitting the crop to pass over the upper side of said rollers to a discharge end thereof.

4. The harvester according to claim 1 further characterized in that said separator rollers are comprised of notched, rubber-like material, said rollers also formed as brushes at their rear end for cleaning the crop passing thereover.

5. The harvester as defined in claim 1 wherein said transversely moving conveyor is located beneath said intermediate portion of said swingable frame and closely adjacent said crop pick-up device, and said pivoted frame end is located rearwardly of said transversely moving conveyor.

6. The harvester described in claim 1 including a flexible sheet-like flap secured transversely along the forward, lower side of said device for contact by the crop lying on the ground as the harvester passes thereover, said flexible flap having recesses formed therein to facilitate passage of the crop past said flap, said flap cooperating with said fingers to pick up said crop.

7. A pick-up harvester for a crop such as apples, oranges, or the like lying on the ground, said harvester comprising; a main frame having ground engaging means for travel over the ground, a rotary crop pick-up device located generally forwardly on the main frame and arranged transversely with respect to the normal direction of harvester travel, said rotary pick-up device including a drum rotatable about a horizontally, transversely extending axis with its lowermost side rotating forwardly in said direction of harvester travel, a plurality of flexible fingers mounted on and extending outwardly from the drum, a cover extending around and spaced from a portion of the periphery of said drum and cooperating with said fingers to convey the crop engaged by the fingers upwardly and over the drum for discharge rearwardly therefrom, said crop pick-up device being pivotally mounted solely intermediate its transverse length for swinging about a generally fore and aft axis in respect to normal forward movement of said harvester whereby the transverse ends of said device can rise and fall in opposition to one another, and means for mounting said frame at its rear end about a transversely extending axis for permitting vertical movement of said frame about said transversely extending axis.

8. The harvester described in claim 7 including a conveyor located on said harvester for receiving the crop from a transversely moving conveyor and elevating it, a trash separator located adjacent the upper end of said conveyor for receiving the crop therefrom, said separator including a plurality of pairs of rollers adapted to pull foreign material downwardly therethrough while permitting the crop to pass over the upper end of said rollers to a discharge end thereof.

9. A crop pick-up assembly for a harvester of a crop material, such as oranges, apples or the like lying on the ground, said assembly including a drum frame, a drum rotatably mounted in said drum frame and arranged transversely in respect to the forward direction of travel of said harvester, said drum having a plurality of flexible fingers extending radially therefrom and circumferentially spaced therearound, and means for rotating said drum in a direction with its lowermost side moving in a forwardly direction in respect to harvester travel, a cover mounted on said drum frame and spaced a distance from said drum whereby the outer ends of said fingers move adjacent to and cooperate with said cover in lifting the crop over said drum and discharging it rearwardly therefrom, ground engaging gauge means carried by said drum frame for maintaining said drum at a constant attitude to the ground over which it traverses, a swingable frame having a front end, means for mounting said drum frame to said swingable frame solely intermediate the transverse length of said drum frame about a generally fore and aft axis in respect to the direction of harvester forward movement whereby said ends of said drum can rise and fall in opposition with respect to one another as the assembly moves over undulating ground, said swingable frame having a rear end pivotally mounted on said harvester about a generally transversely and horizontally extending axis whereby said drum can also rise and fall bodily in a generally vertical direction.

10. The assembly as set forth in claim 9 including a flexible sheet like flap secured transversely along the forward, lower side of said assembly for contact by the crop lying on the ground, said flexible flap having recesses formed therein to facilitate passage of the crop past said flap, said flap cooperating with said fingers to initially pick up said crop.

11. The assembly as set forth in claim 9 further characterized in that said fingers are formed of a rubber material and are serrated along at least a portion of their length to thereby facilitate grasping of said crop but preventing bruising thereof.

12. A rotary crop pick-up device for a harvester of a crop material, such as oranges, apples or the like lying on the ground, said device including a frame, a drum rotatably mounted on said frame and arranged transversely in respect to the forward direction of travel of said harvester, said drum having a plurality of flexible fingers extending radially therefrom and circumferentially spaced therearound, and means for rotating said drum in a direction with its lowermost side moving in a forwardly direction in respect to harvester travel, a cover mounted on said frame and of a shape which cooperates with a portion of said drum and spaced a distance therefrom whereby the outer ends of said fingers move adjacent to and cooperate with said cover, said cover and said fingers cooperating to lift the crop over said drum and discharge it rearwardly therefrom, ground engaging gauge means carried by said frame for maintaining said drum at a constant attitude to the ground over which it traverses, and means for mounting said frame solely intermediate its transverse length and about a generally fore and aft axis in respect to the direction of harvester forward movement whereby said ends of said device can rise and fall in opposition with respect to one another as the device moves over undulating ground, and means for mounting said frame at its rear end about a transversely extending axis for permitting vertical movement of said frame about said transversely extending axis.

13. The device as set forth in claim 12 including a flexible sheet like flap secured transversely along the forward, lower side of said device for contact by the crop lying on the ground as the harvester passes thereover, said flexible flap having recesses formed therein to facilitate passage of the crop past said flap, said flap cooperating with said fingers to initially pick up said crop.

14. The device as set forth in claim 12 further characterized in that said fingers are formed of a rubber material and are serrated along at least a portion of their length to thereby facilitate grasping of said crop but preventing bruising thereof.

15. The device as set forth in claim 13 further characterized in that said fingers are formed or a rubber material and are serrated along at least a portion of their length to thereby facilitate grasping of said crop but preventing bruising thereof.

* * * * *